United States Patent [19]
Toker

[11] Patent Number: 5,365,562
[45] Date of Patent: Nov. 15, 1994

[54] DIGITAL IMAGING APPARATUS

[75] Inventor: Emre Toker, Waltham, Mass.

[73] Assignee: Fischer Imaging Corporation, Denver, Colo.

[21] Appl. No.: 123,726

[22] Filed: Sep. 20, 1993

[51] Int. Cl.$^5$ .............................................. A61B 6/00
[52] U.S. Cl. ........................................ 378/37; 378/62; 250/367
[58] Field of Search ........................... 378/37, 62, 98; 250/367, 361 R, 370.09, 486.1

[56] References Cited

U.S. PATENT DOCUMENTS

| | | | |
|---|---|---|---|
| 3,519,820 | 7/1970 | Erikson | 250/367 |
| 4,613,982 | 9/1986 | Darnheim et al. | 378/37 |
| 4,821,727 | 4/1989 | Levene et al. | 378/37 X |
| 4,852,137 | 7/1989 | Mackay | 378/62 |
| 5,078,142 | 1/1992 | Siczek et al. | 128/653 |
| 5,142,557 | 8/1992 | Toker et al. | 378/37 |
| 5,216,250 | 6/1993 | Pellegrino et al. | 250/370 |

Primary Examiner—David P. Porta
Attorney, Agent, or Firm—Sheridan Ross & McIntosh

[57] ABSTRACT

A medical imaging system (10) which is readily adaptable to suit specific imaging conditions is disclosed. The system comprises an imaging signal source (12) for transmitting a first imaging signal (13) through a patient's body, a signal detector unit (26) for receiving the first signal (13) and transmitting a second signal (22), and a digital camera for processing the second signal (22) so as to produce an image of an area of interest within the patient's body. The signal detector unit (36) includes a number of signal detector elements (30) each having different performance characteristics. The system (10) further includes a controller (32) for selecting a signal detector element (30) relative to particular imaging conditions.

16 Claims, 1 Drawing Sheet

DIGITAL IMAGING APPARATUS

FIELD OF THE INVENTION

This invention relates generally to x-ray imaging and, in particular, to an improved digital imaging device which is readily adaptable to suit specific imaging conditions. The imaging device of the present invention is particularly useful for medical imaging applications such as breast imaging.

BACKGROUND OF THE INVENTION

X-ray imaging is used for a variety of purposes such as medical imaging and non-destructive testing of industrial components. With respect to medical imaging, many digital imaging devices, i.e., non-film based imaging devices, are known. One such lens-based device is disclosed in U.S. Pat. No. 5,216,250 which is incorporated herein by reference in its entirety.

The '250 device, which is particularly intended for imaging a patient's breast, includes an x-ray source, a compression plate for compressing the patient's breast, a light-tight housing containing a mounted phosphor screen, a lens for focussing light emitted by the phosphor screen and related digital processing equipment. In operation of the '250 device, x-ray radiation is transmitted through the patient's compressed breast and impinges upon the mounted phosphor screen. The mounted phosphor screen, in turn, emits light which is focused by the lens on a charge coupled device (CCD) array of a digital camera so as to produce an image of an area of interest within the patient's breast.

Although lens-based digital imaging devices such as the '250 device are currently being utilized for certain medical imaging applications, some difficulty has been experienced due to the variables encountered in practice. In particular, such lens-based digital imaging systems have sometimes provided less than optimal image contrast and/or resolution for particular medical imaging applications.

SUMMARY OF THE INVENTION

The present invention discloses an improved digital imaging system wherein the image contrast and resolution of the produced image can be tailored to suit specific imaging conditions. The imaging system of the present invention can be advantageously employed in a variety of medical or non-medical imaging settings where the desired image contrast and resolution can change from image-to-image, case-to-case or patient-to-patient.

The case of breast imaging is illustrative. It is now common for women to undergo routine screening mammography to detect any breast lesions which are suspicious for cancer. If a suspicious lesion is identified, further mammograms may be taken and visually analyzed for diagnosis purposes. Additionally, in many cases, physicians are now recommending a needle biopsy of suspicious lesions to obtain a cytological or histological diagnosis of the lesion. Such needle biopsy procedures normally involve taking stereotactic views of the breast to identify the three-dimensional coordinates of the lesion for subsequent biopsy needle insertion. Similar localization views may be obtained prior to open surgery to assist in guiding the surgeon to the area of interest.

Accordingly, many factors affect the desired image contrast and resolution for a particular breast imaging application. For example, from the foregoing discussion, it will be appreciated that breast imaging is conducted for a variety of purposes and, as a result, the desired image contrast or resolution can vary. Additionally, the type of lesion involved affects the desired image contrast or resolution. In this regard, the physician often knows the type of lesion which is to be imaged in a particular imaging situation based on prior imaging procedures. The nature of the breast tissue imaged also affects the desired image contrast or resolution.

Generally, high image resolution is desired for screening and diagnosis applications and for imaging very small lesions. Resolution requirements may be less stringent for localization procedures and for imaging larger lesions. High contrast is desirable for imaging lesions in thick or fatty breasts and for imaging low contrast masses. Thus, for example, in a localization procedure where the breast involved is relatively thick and fatty and the lesion of interest is a relatively large, low contrast mass, contrast enhancement may be of greater importance than resolution. Conversely, for diagnosing microcalcifications in a breast of ordinary density, resolution may be of primary importance.

According to one aspect of the present invention, an imaging system is provided which allows for selection of an appropriate imaging signal detector to suit specific imaging conditions. In imaging applications such as x-ray imaging, the task is to differentiate an object from the background. In accordance with the present invention, if the general characteristics of the object and the background are known prior to the acquisition of an image, an imaging signal detector for that particular object and background can be automatically selected and used, thus enhancing image quality.

The imaging system of the present invention comprises an imaging signal source for transmitting a first imaging signal through an area of interest within a patient's body; an imaging signal detector, including at least two signal detector elements, for receiving the first imaging signal and transmitting a second imaging signal in response to the received first imaging signal; a receiver for receiving the second imaging signal and producing an image of the area of interest within the patient's body based on the received second imaging signal; and a mechanism for allowing the first imaging signal to be selectively received by one of the detector elements.

By way of example, the imaging source can include an x-ray tube for directing x-rays through the patient's body. The detector elements can comprise known phosphorescent screens which emit light upon excitation by incident x-rays, scintillating fiber optics having x-ray absorbing material doped into the fiber optic structure, or other detector elements. By providing a plurality of such detector elements having different performance characteristics, e.g., in terms of x-ray absorption, light output or limiting resolution, the imaging system can be provided with the capability to adapt to specific imaging needs. The receiver can include a digital camera for receiving light from the screen and providing substantially real time imaging.

The selection mechanism allows a user to determine which detector element will be placed in the path of the first imaging signal. In principle, any mechanism which provides relative movement between the first imaging signal and the detector elements can be employed.

Thus, the signal source and/or the patient can be positioned relative to the detector elements; the first imaging signal can be deflected or reflected relative to the detector elements; and/or the signal detector elements can be moved relative to the first imaging signal. In terms of the exemplary components described above, selection of an appropriate screen can be conveniently accomplished by positioning the screen relative to the x-ray beam. For example, each of the screens can be supported on an electromechanical platform or on a manually or mechanically driven carousel to allow for screen positioning.

According to another aspect of the present invention, the detector element to be employed for a particular imaging situation can be automatically selected based on particular imaging conditions. In this regard, the selection mechanism is operatively associated with a controller such as a computer. Screen selection is then determined relative to imaging condition information. The user can direct the computer to select a particular screen or the screen selection can be based on imaging condition information supplied to the computer by the user and/or via feedback from the imaging system.

In one embodiment, an imaging system for imaging an area of interest within a patient's breast is provided. A compression device is utilized to immobilize the patient's breast. X-rays are transmitted from an x-ray tube through the patient's compressed breast and are received by one of a number of phosphorescent screens which are supported on a electromechanical platform or carousel. The selected screen in turn emits light which is focused by a lens on a CCD imaging camera to produce an image of the patient's breast. Selection of a desired screen is conducted relative to imaging condition information input into a computer which drives the platform or carousel. The imaging condition information can include, for example, information regarding the nature of the breast tissue to be imaged (e.g., fattiness, thickness, density etc.), the suspected type of lesion to be imaged (e.g., low contrast mass, microcalification, etc.), the imaging application (e.g., screening, diagnosis, localization, etc.), the desired image quality (e.g., resolution, contrast etc.) permissible dosage or other factors. Based on this information and information stored in the computer correlating imaging conditions to the type of screen indicated, the computer causes the selected screen to be positioned by the platform or carousel so as to receive the x-ray signal. Alternatively, the user can directly choose a screen suited for a particular imaging situation and command the computer to select the screen.

DETAILED DESCRIPTION

Although the imaging system of the present invention is useful in a variety of medical and non-medical imaging applications including, for example, the non-destructive testing of industrial components, the imaging system will be described in connection with a specific application wherein the imaging system is incorporated into a Drone stereotactic mammographic biopsy system. Such biopsy systems are commercially available from Fischer Imaging Corporation, Denver, Colorado under the trade name MAMMOTEST and from Lorad Corporation, Danbury, Conn., under the trade name STEREOGUIDE. One such system is disclosed in detail in U.S. Pat. No. 5,078,142, which is incorporated herein by reference in its entirety.

Generally, prone stereotactic mammographic biopsy systems are used to obtain a biopsy sample from a suspicious breast lesion via a needle thereby obviating the need for open surgical biopsy for many patients. During the procedure, the patient lies in a prone position on a specially designed table with her breast projecting pendulantly through an opening in the table. The patient's pendulant breast is compressed throughout the procedure to immobilize the breast and facilitate imaging. Based on previously obtained radiographs or scout images, a general approach position is selected. Stereotactic images, obtained by positioning the imaging equipment at two separate angles beneath the table are then used to determine the three-dimensional or spatial coordinates of the suspicious lesion. A puncture instrument retaining the biopsy needle is then directed to the suspicious lesion to obtain a cell or tissue sample for cytological or histological analysis.

Upon consideration of the present disclosure, it will be appreciated that the adaptable imaging system of the present invention is particularly advantageous in the context of breast imaging applications such as the prone stereotactic mammographic biopsy procedure described above. Specifically, the desired image contrast and resolution can vary greatly depending, for example, on the nature of the breast tissue or type of lesion involved. In addition, because the desired image contrast and resolution can normally be determined in advance of obtaining the stereotactic views, e.g., based on previous radiographs or scout images, it is possible, in accordance with the present invention, to adapt the imaging system to accommodate specific imaging conditions.

Figure 1:
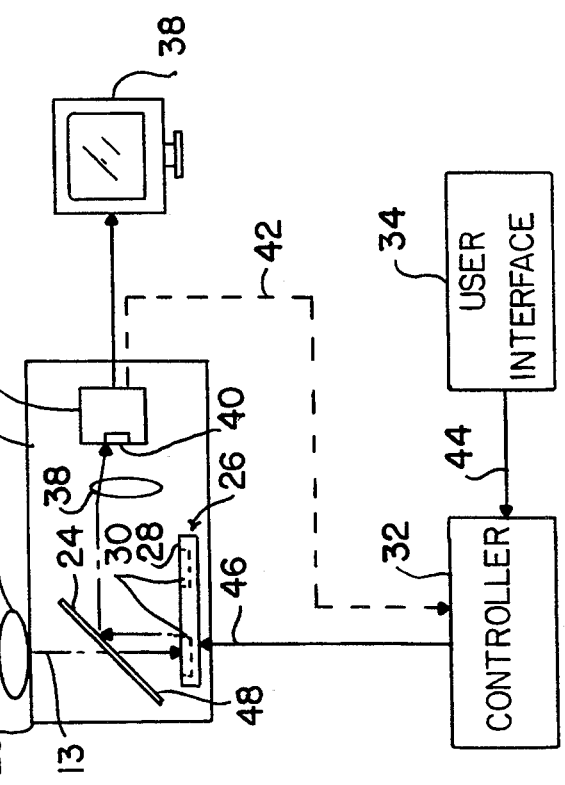
FIG. 1 is a side view of an imaging system constructed in accordance with the present invention with the included control system shown schematically.

Referring to FIG. 1, an imaging system constructed in accordance with the present invention is generally identified by the reference numeral 10. The imaging system 10, which can be incorporated into a prone stereotactic mammographic biopsy system as described above, includes: an imaging source 12 such as a conventional x-ray tube for transmitting a first imaging signal 13; a compression device 14 for compressing the patient's breast 16; downstream imaging signal processing components contained within housing 18 and related control system components: and conventional monitor 38 for displaying images of the patient's breast 16. The components housed within housing 18 include a signal detector unit 26 for receiving the first signal 13 and transmitting a second signal 22 in response thereto, a mirror 24 which is transparent or substantially transparent to the first signal 13 but reflects the second signal 22, and optical components 38 which can comprise a lens for focussing the second signal 22 onto a CCD detector 40 of digital camera 36.

The compression device 14 comprises a pair of compression surfaces, at least one of which is moveable to compressingly engage the patient's breast 16. The patient's breast 16 can conveniently be compressed between a single, moveable compression plate which is preferably transparent to the first imaging signal 13 and the top wall 20 of the housing 18 as shown. Alternatively, two compression plates can be provided to allow for movement of the housing 18 independent of the patient's compressed breast 16.

The signal processing components housed within housing 18 receive and detect the first imaging signal 13, selectively convert the first imaging signal 13 into a second imaging signal 22 for enhanced image quality, and process the second imaging signal 22 so as to obtain substantially real-time imaging of the breast 16. Accordingly, the top wall 20 of housing 18 is preferably transparent to the first imaging signal 13 or is provided with a transparent window.

Within housing 18 the first imaging signal 13 passes through a thin film pellicle mirror 24 and is received by signal detector unit 26. It will thus be appreciated that the mirror 24 also is preferably transparent to the first imaging signal 13. In the illustrated embodiment, wherein the first imaging signal is an x-ray signal, the mirror 24 can be constructed as disclosed in U.S. Pat. No. 5,216,250 incorporated by reference herein. In this regard, the mirror can comprise a film of high tensile strength elastic membrane material such as nitrocellulose having a thickness between about 5 and 9 microns. The mirror 24, which also serves to reflect the second imaging signal 22, will be further described below.

Figure 2:
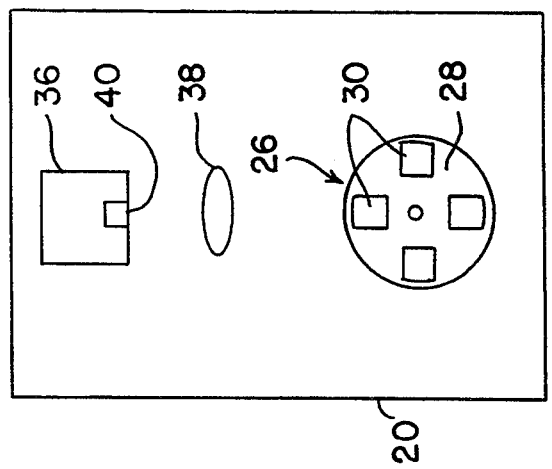
FIG. 2 is a top view of a portion of the imaging system of FIG. 1.
Figure 3:
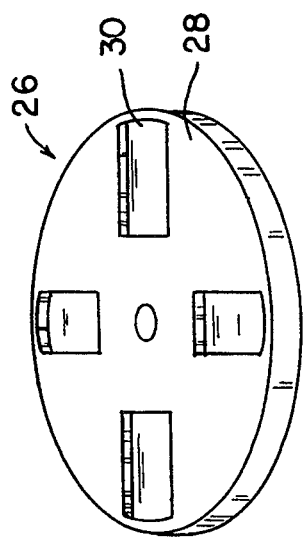
FIG. 3 is a perspective view of a carousel for carrying a number of phosphor screens.

The signal detection unit 26 as shown in FIGS. 1-3 comprises a carousel 28 which supports a number of signal detector elements 30 for receiving the first imaging signal 13 and transmitting a second imaging signal 22 in response thereto. The illustrated elements 30 are conventional phosphorescent screens which emit light upon excitation by x-ray radiation.

The signal detector unit 26 allows the user to select an appropriate screen for specific imaging conditions thereby allowing for improved imaging capability relative to known lens-based digital imaging systems. The performance characteristics, e.g., in terms of x-ray absorption, light output, and limiting resolution, of commercially available phosphorescent screens can vary considerably. In this regard, the performance characteristics of particular screens can be obtained from the manufacturer or through well-known tests. Table 1 records some approximate relative performance characteristics for various commercially available phosphor screens.

| Phosphor Screen | Relative absorption | Relative light output | Relative limiting resolution |
| --- | --- | --- | --- |
| PERFORMANCE CHARACTERISTICS OF VARIOUS PHOSPHOR SCREENS | | | |
| Lanex Fast Back | 100 | 75 | 3.5 |
| Lanex Regular | 94 | 98 | 6.3 |
| Lanex Medium | 91 | 86 | 6.3 |
| Lanex Fast Front | 89 | 100 | 6.3 |
| MR Detail | 84 | 30 | 10 |
| Proprietary special | 81 | 93 | 10 |
| Lanex Fine | 77 | 32 | 8.5 |
| Min-R Medium | 77 | 53 | 8.5 |
| Min-R Fast Back | 77 | 53 | 8.5 |
| Min-R Fast Front | 45 | 35 | 9.5 |

In addition, it has been found that different screens with different performance characteristics, when utilized in a lens-based digital imaging system, are suited for different breast imaging tasks. For example, where contrast enhancement is critical, such as in localizing a large low contrast mass in fatty breast tissue, a screen having excellent x-ray absorption and light output such as the Lanex Regular screen manufactured by Kodak may be desired. For smaller lesions where contrast is not a problem, a screen with excellent limiting resolution such as the Lanex Fine screen manufactured by Kodak may be preferred.

The carousel 26 thus supports more than one screen so that the illustrated lens-based digital imaging system 10 can be adapted for specific imaging situations. In principle, the carousel 26 may support any useful number of screens, though the actual number of screens may be limited by space or other practical considerations. The illustrated carousel 26 supports four screens which is believed to allow for imaging flexibility adequate for most ordinary imaging conditions. The screens are carried in indentations 30 formed in the carousel 26 to correspond to the dimensions of the screens. The carousel 26 is manually rotatable or is rotatably driven by a computer-controlled motor, in a manner which is well-known in the art, to allow an appropriate screen to be positioned in the x-ray path.

Selection of an appropriate screen is accomplished by prompting the controller 32, which can comprise a computer, to drive the carousel 26 (as generally indicated by arrow 46) to the corresponding carousel position. For example, the user can direct the controller 32 to select a desired screen by entering a simple command, such as "Select Screen A", into user interface 34 which can comprise a keyboard Optionally, the controller 32 can receive information regarding the imaging conditions and use the received imaging condition information to automatically select an appropriate screen based on a library of stored information correlating particular imaging conditions to the indicated screen or screen type. The imaging condition information may be input by the user via user interface 34, as generally indicated by arrow 44, and/or received by the controller 32 in the form of feedback, generally indicated by phantom arrow 42, from camera 36 or other components of imaging system 10. For example, feedback 42 may indicate that insufficient light has been received by camera 36 thereby prompting the controller 32 to select a screen with a higher light output. It will be appreciated that feedback indicative of other parameters can be utilized. The input information 44 can similarly be presented in a variety of forms relating to the nature of the breast tissue, lesion type, desired image quality, dosage conditions, related component information (e.g., relating to tubehead or camera specifications, information regarding any anti-scatter grids employed, etc.) or the like. As a simple example, the user may input information indicating that the breast tissue is fatty and the lesion is a low contrast mass. In response, the controller 32 could position the carousel 26 so that a screen having excellent contrast enhancement characteristics is presented.

Once an appropriate screen is selected, exposure is initiated in the usual manner by activating source 12. The source 12 transmits the first imaging signal 13 which passes through the compression device 14, the patient's compressed breast 16, top wall 20 of housing 18 and mirror 24 so as to impinge on a screen carried by carousel 26. The screen in turn emits a second signal 22 which is reflected by mirror 24. In this regard, the bottom surface 48 of the mirror 24 can be treated to enhance reflection. A uniform coating of aluminum and silicon dioxide can provide the desired reflection enhancement. As shown, the mirror 24 is angled to direct the reflected second signal 22 to camera 36.

The second signal 22 is focused, via optical components 38 which can comprise a lens, onto a CCD detector 40 of digital camera 36. A variety of conventional cameras are suitable for use in the imaging system 10. One such camera is disclosed in detail in U.S. Pat. No. 5,216,250, incorporated herein by reference. The camera 36 processes the second signal 22 in a known manner and communicates the resulting imaging information (indicated by arrow 50) to monitor 38 which displays an image of the patient's breast 16. Finally, to accomplish stereotactic localization, the user can successively store a pair of stereotactic views in controller memory, then call the views to the monitor and activate a cursor on the lesion location as depicted in the stereo views. The controller then automatically calculates the lesion coordinates and displays the coordinates or drives servo motors for positioning the puncture instrument so as to obtain a biopsy sample.

While various embodiments of the present invention have been described in detail, it is apparent that further modifications and adaptations are within the spirit and scope of the present invention.

What is claimed is:

1. An apparatus for imaging an area of interest within a patient's breast, comprising:
   compressing means for compressing said patient's breast;
   transmitting means for transmitting a first imaging signal through said area of interest within said patient's compressed breast;
   signal detector means positioned in opposing relation to said transmitting means with said patient's compressed breast positioned therebetween, for receiving said first imaging signal and transmitting a second signal responsive thereto, said signal detector means including a plurality of signal detector elements each having selected signal detector performance characteristics;
   receiving means for receiving said second imaging signal and producing an image of said area of interest within said patient's compressed breast based upon said received second imaging signal;
   positioning means for allowing said first imaging signal to be selectively received by one of said plurality of signal detector elements; and
   user selection means, operatively associated with said positioning means, for allowing a user to select one of said plurality of signal detector elements for receiving said first imaging signal relative to particular imaging conditions.

2. The apparatus of claim 1, wherein said positioning means comprises means for moving said signal detector means relative to said first imaging signal.

3. The apparatus of claim 1, wherein said positioning means comprises a motor for driving said signal detector means between a first position wherein a first of said plurality of signal detector elements receives said first imaging signal and a second position wherein a second of said plurality of signal detector elements receives said first imaging signal.

4. The apparatus of claim 1, wherein said signal detector means comprises support means for carrying said plurality of signal detector elements.

5. The apparatus of claim 1, wherein said user selection means comprises a computer operative for receiving information regarding characteristics of said patient's breast.

6. The apparatus of claim 1, wherein said user selection means comprises a computer operative for receiving information regarding characteristics of said area of interest.

7. The apparatus of claim 1, wherein said receiving means comprises a charge coupled device.

8. The apparatus of claim 1, wherein said user selection means comprises a computer operative for receiving input information regarding imaging conditions and for selecting a signal detection element based on stored information correlating imaging conditions to signal detector performance characteristics.

9. An apparatus for imaging an object of interest, comprising:
   a transmitter for transmitting a first imaging signal through said object of interest;
   support means, positionable in opposing relation to said transmitter with said object of interest positioned therebetween, for supporting at least first and second signal detector elements, said first and second signal detector elements adapted for receiving said first imaging signal transmitted through said object of interest and for transmitting a second imaging signal responsive to said received first imaging signal, wherein said first signal detector element has performance characteristics different than that of said second signal detector element;
   a receiver for receiving said second imaging signal and for producing an image of said object of interest based upon said received second imaging signal; and
   selection means for allowing said first imaging signal to be selectively received by either said first signal detector element or said second signal detector element.

10. The apparatus of claim 9, wherein said support means comprises motorized means for carrying said signal detector elements between a first position wherein a first of said signal detector elements receives said first signal and a second position wherein a second of said signal detector elements receives said first signal.

11. The apparatus of claim 9, wherein said receiver comprises a digital camera for producing substantially real time images of said object of interest.

12. The apparatus of claim 9, wherein said selection means comprises a computer for use in positioning said support means.

13. The apparatus of claim 9, wherein said selection means comprises a computer for receiving information regarding imaging conditions.

14. An apparatus for imaging an area of interest within a patient's breast, comprising:
   a moveable member for compressingly engaging said patient's breast;
   an x-ray source for transmitting x-rays through said patient's compressed breast;
   support means for supporting first and second phosphorescent screens adapted for receiving said x-rays and emitting light responsive thereto, wherein said first phosphorescent screen has greater limiting resolution than said second phosphorescent screen;
   positioning means for use in moving said support means between a first position wherein said first phosphorescent screen receives said x-rays and a second position wherein said second phosphorescent screen receives said x-rays.

15. The apparatus of claim 14, wherein said support means comprises motorized means for supportably retaining said phosphorescent screens.

16. The apparatus of claim 14, wherein said selection means comprises a computer operative for selecting between said first and second phosphorescent screens based on information regarding said area of interest.

* * * * *